United States Patent [19]
Oh

[11] Patent Number: 6,091,672
[45] Date of Patent: Jul. 18, 2000

[54] ADAPTER FOR COUPLING AUDIO SIGNALS TO FRONT-LOADING OR SIDE-LOADING CASSETTE PLAYBACK DECKS, AND METHOD FOR USING SAME

[75] Inventor: Sang Hoon Oh, East Hills, N.Y.

[73] Assignee: Coby Electronics Corporation, Maspeth, N.Y.

[21] Appl. No.: 09/241,502

[22] Filed: Feb. 1, 1999

[51] Int. Cl.[7] .................................................. H04B 1/20
[52] U.S. Cl. .............................................. 369/2; 369/289
[58] Field of Search ............................ 369/2, 1, 21, 11, 369/289, 3, 4–5, 12; 360/104, 132, 137, 109; 174/65 R

[56] References Cited

U.S. PATENT DOCUMENTS

| | | | |
|---|---|---|---|
| 3,946,156 | 3/1976 | Budrose | 369/1 |
| 4,287,388 | 9/1981 | Beer et al. | 369/21 |
| 4,333,172 | 6/1982 | Chen | 369/2 |
| 4,734,897 | 3/1988 | Schotz | 369/2 |
| 5,161,131 | 11/1992 | Borchadt et al. | 369/1 |
| 5,307,326 | 4/1994 | Osawa | 369/2 |
| 5,444,675 | 8/1995 | DeBie et al. | 369/2 |
| 5,586,090 | 12/1996 | Otte | 369/2 |
| 5,910,866 | 6/1999 | Shiomoto | 360/104 |

*Primary Examiner*—Ali Neyzari
*Attorney, Agent, or Firm*—Brown Raysman Millstein Felder & Steiner LLP

[57] ABSTRACT

A cassette adapter for coupling audio signals from an external source to a cassette player for reproduction by the cassette player. The adapter is user-configurable for use in cassette players of the side-load and front-load type. Additionally, the user-configurability of the adapter overcomes problems inherent in prior art adapters, such as the tendency for the fraying and cutting of the connections between the prior art adapters and the sources of the audio signals. The adapter includes a cassette-shaped housing, a record head disposed in the housing in a position substantially adjacent to a playback head of the cassette player when the adapter is inserted in the cassette player, a connector detachably connectable to a complementary connector, the connector positioned along a peripheral wall of the housing, and a conductive circuit coupled to the record head and the connector.

24 Claims, 7 Drawing Sheets

ADAPTER FOR COUPLING AUDIO SIGNALS TO FRONT-LOADING OR SIDE-LOADING CASSETTE PLAYBACK DECKS, AND METHOD FOR USING SAME

BACKGROUND OF THE INVENTION

The invention disclosed herein relates generally to cassette adapters. More particularly, the present invention relates to a cassette adapter for coupling audio signals from a source to a conventional cassette playback deck of either the front-load or side-load types.

In general, a conventional cassette playback deck, such as the type commonly installed in automobiles, is capable of reproducing audio signals from pre-recorded magnetic tapes stored within cassette housings but cannot be detachably connected to other sources for reproduction of audio signals from such other sources as portable radios, portable compact disc players, or cellular telephones. Due to design and engineering constraints, audio systems commonly installed in automobiles generally do not have jacks or other connectors enabling a user to couple a source of audio signals, other than a pre-recorded cassette, to the cassette player.

With the proliferation of portable electronic devices which generate audio signals, there is a need for an adapter which allows a user to interface a portable electronic device to a cassette player such that the audio signals generated by the electronic device may be played through the cassette player's audio system.

While there are cassette adapters known in the art for coupling audio signals from portable electronic devices to cassette players, such as U.S. Pat. No. 4,734,897, "Cassette Adapter for Playback Device, Such as a Compact Disk Player", which is incorporated herein by reference, and U.S. Pat. No. 4,287,388, "Drive-in Theatre Sound Distribution System", which is incorporated herein by reference, the cassette adapters known in the art suffer from problems and drawbacks which make them difficult to use and shorten their useful lifespan.

Cassette adapters disclosed in the prior art allow use in both side-load and front-load assette players by providing a length of wire, permanently and internally connected to the adapter's cassette-shaped housing, which can slide within the housing such that the wire can be positioned parallel to a side wall of the housing or, alternatively, parallel to the front wall of the housing. Such wires tend to fray with use since the wires are not prevented from sliding along slits in the housing. Once the wires tear, the adapter can no longer be used. In fact, the proper use of such adapters calls for the user to slide the wires from position to position for use with cassette players of different configurations. Additionally, once the wires have been configured for use in a particular cassette player, there is a tendency for the wires to slide from position to position, thus possibly interfering with the operation of the cassette player and contributing to the wear and tear on the wires where they slide against the housing.

There is thus a need for a cassette adapter useful for coupling audio signals from an electronic audio signal-generating source to a cassette player, such that the cassette adapter is easy to use in both front-load and side-load cassette players and such that the cassette adapter is inexpensive and long-lasting.

BRIEF SUMMARY OF THE INVENTION

It is an object of the present invention to solve the problems described above associated with existing cassette adapters for coupling audio signals from a source to a cassette player.

It is another object of the present invention to provide an inexpensive and long-lasting adapter for coupling audio signals from a source to a cassette player of the side-load or front-load configuration.

It is another object of the present invention to provide a single model of adapter which can be used to couple audio signals to both side-load and front-load cassette players.

The above and other objects are achieved by an adapter which is provided in the general shape of a standard cassette housing for use in cassette players of both the side-load and front-load configurations. The adapter includes a cassette-shaped housing, a record head disposed in the housing in a position substantially adjacent to a playback head of the cassette player when the adapter is inserted in the cassette player, a connector detachably connectable to a complementary connector, with the connector positioned along a first peripheral wall of the housing, and a conductive circuit coupled to the record head and the connector.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Figure 1:
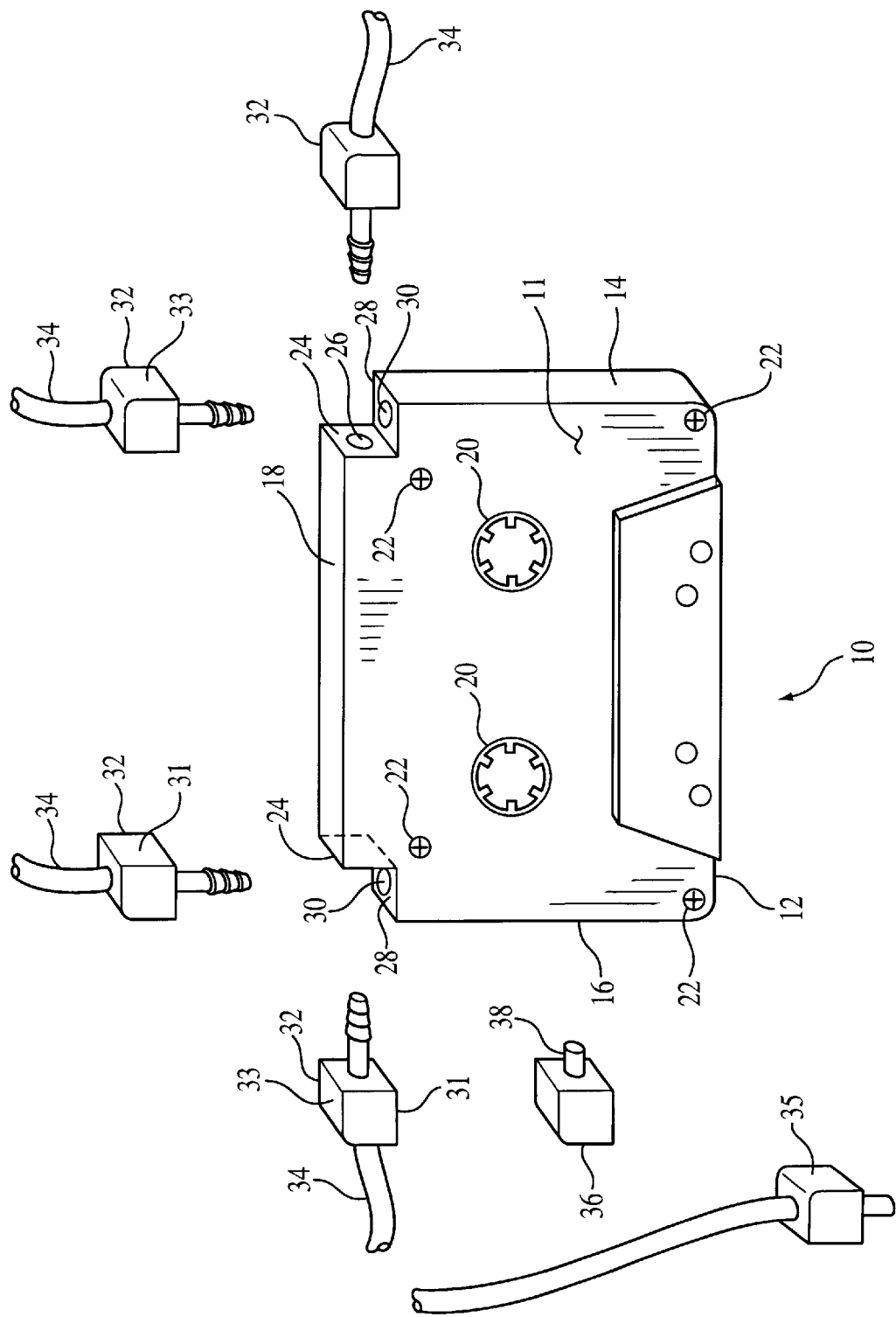
FIG. 1 is a top plan view of a first embodiment of the present invention.

With reference to FIG. 1, one preferred embodiment of the adapter 10 of the present invention includes a housing 11, generally in the shape of a cassette tape for use in standard cassette players and recorders. Housing 11 has a right side wall 14, a rear wall 18, a left side wall 16 and a front wall 12, and within the housing 11 are two reels 20 rotatably mounted. As with a standard tape, the housing is inserted into a cassette player such that the cassette player's reel drive spindles (not shown) may engage reels 20 and such that the front wall 12 will be proximate to the play or play/record head of the cassette player (not shown; see FIG. 7). As with a typical cassette tape housing, in a preferred embodiment of the present invention, housing 11 may optionally comprise two halves, the halves attached to each other with screws 22 or other conventional connection mechanisms.

In order to allow the use of the cassette adapter 10 in cassette players of both the front load type, wherein the adapter 10 is inserted into the cassette player such that the front wall 12 is inserted into the cassette player first, as well as the side-load type, wherein the adapter 10 is inserted into the cassette player such that either the right side wall 14 or left side wall 16 is inserted into the cassette player first, the cassette adapter 10 also includes electrical conductor connectors such as receptacles 26 and 30 configured at right angles to each other at the intersection of the side walls 14, 16 and the rear wall 18.

The receptacles 26 for use with side-load cassette players are positioned at cut-out areas 24 of the housing 11. Areas 24 of the housing 11 are positioned, for example, at right angles to the rear wall 18 and parallel to the side walls 14, 16. The receptacles 30 for use with front-load cassette players are positioned at cut-out areas 28 of the housing 11. Areas 28 of the housing 11 are positioned, for example, at right angles to side walls 14, 16 and parallel to rear wall 18.

Also shown in FIG. 1 is the electrical conductor used for coupling the cassette adapter 10 to a source of audio signals (not shown). The electrical conductor comprises a detachably connectable end 32, such as a ⅛ inch (about 3.175 mm.) stereo phono plug, connected to a length of cable 34 In a preferred embodiment of the invention, the cassette adapter 10 is useful for coupling a stereo audio signal from a source to a cassette deck, and the cable 34 thus comprises three wires, one each for coupling the left channel signal, the right channel signal, and a common ground. Alternatively, the cable 34 may have four wires to allow for independent grounds between the left and right channels. Cable 34 may have two wires if only monaural signals are to be coupled. At the end of cable 34 opposite to the end with connector 32 may be a similar connector, such as a ⅛ inch (about 3.175 mm.) stereo phono jack 35 for connection to a corresponding output jack of a portable electronic device. Alternatively, the end of cable 34 opposite to the end with connector 32 may be permanently connected to an audio-signal generating device. Connector 32 is chosen based on whether the adapter 10 is to be used for stereo or monaural signals. In a preferred embodiment, the adapter is used to couple two channels of stereo signals and thus connector 32 is a ⅛ inch (about 3.175 mm.) stereo phono plug and cable 34 comprises three wires.

As can be seen from the multiple configurations of the connector 32 and cable 34 in FIG. 1, connector 32 may be connected to any of the receptacles 26, 30. This allows the cable 34 to extend either parallel to the side walls 14, 16 or parallel to the rear wall 18 and front wall 12. Connector 32 has one side 31 which is flat and which abuts the cut-out area 24 or 28 when inserted into the receptacle 26, 30 of the other area. Connector 32 has opposing sides 33 which are curved or rectangular.

When the cassette adapter 10 is to be used in a cassette player of the side-load type, in which a side wall 14 or 16 is inserted first into the player, a user will first connect the connector 32 to a receptacle 26. This allows cable 34 to extend parallel to the rear wall 18 and the front wall 12, and allows the cable 34 to extend out of the cassette player without interference.

When the cassette adapter 10 is to be used in a cassette player of the front-load type, in which front wall 12 is inserted into the player first, a user will first connect the connector 32 to a connector receptacle 30. This allows cable 34 to extend parallel to the side walls 14, 16 and allows the cable 34 to extend out of the cassette player without interference.

Also provided, for example, in a kit with the adapter 10 and/or wire 34, is dummy connector 36. Dummy connector 36 has a plug 38 which is detachably connectable to receptacles 26 and 30, and which has a shape such that when the dummy connector 36 is attached to a connector receptacle 26 or 30, for example, in a frictional or force fit, it completes the shape of the housing 11 such that it completes the corner and prevents dust and other foreign matter from coming into contact with the receptacles 26, 30.

Figure 2:
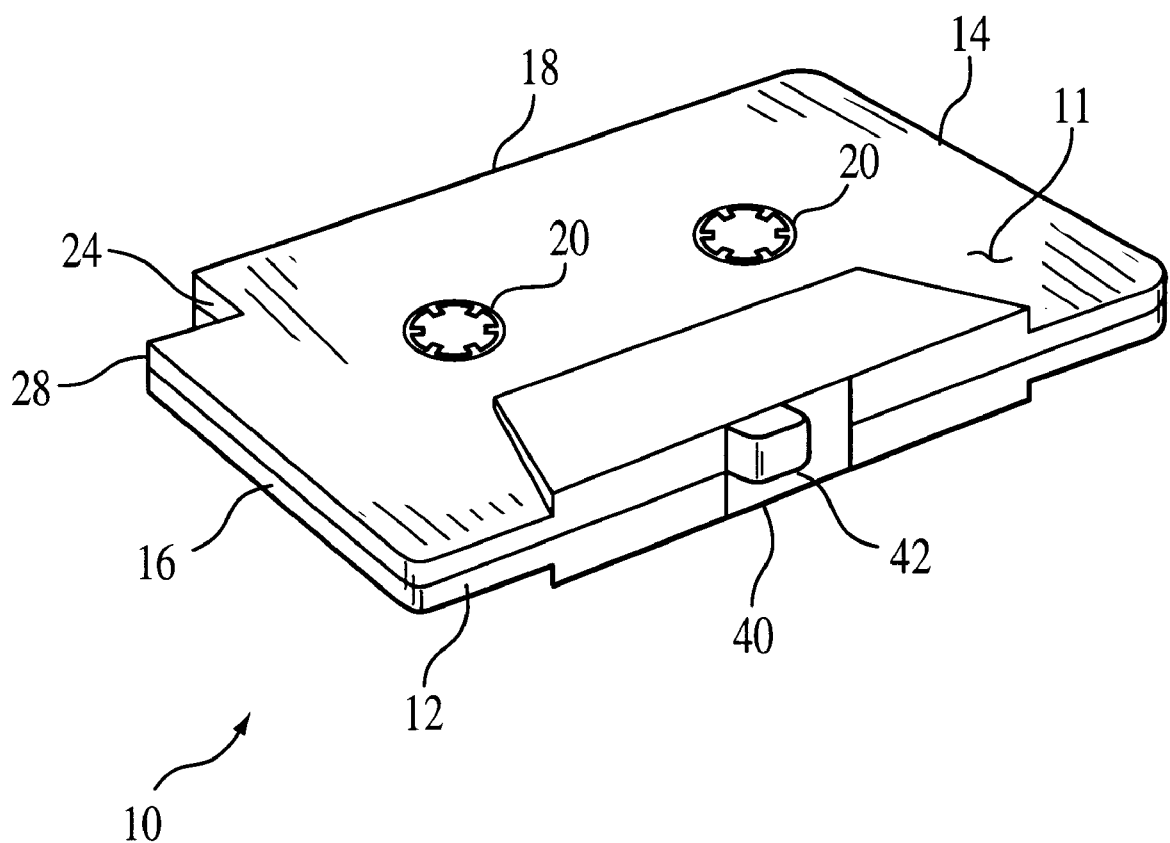
FIG. 2 is a rear perspective view of a second embodiment of the present invention.
Figure 3:
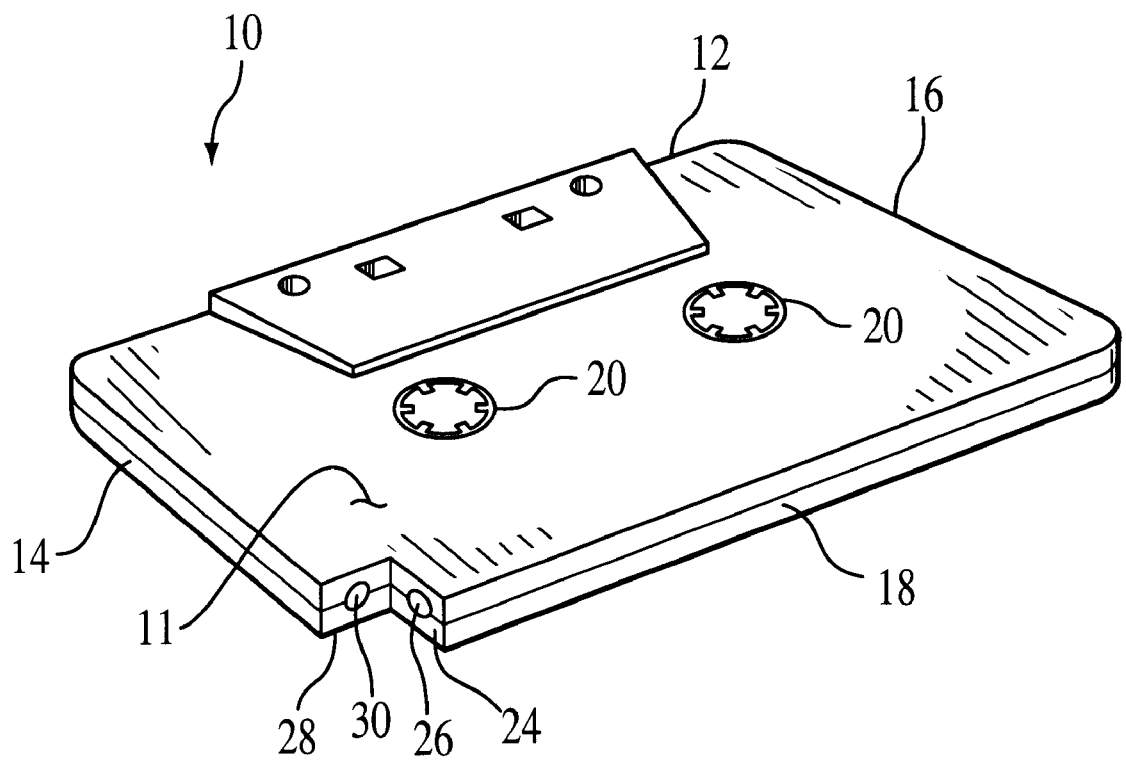
FIG. 3 is a front perspective view of the embodiment of FIG. 2.

FIGS. 2 and 3 are perspective drawings of a second embodiment of the present invention, wherein the receptacles are positioned only at one intersection, such as at the intersection of the rear wall 18 and the left side wall 16 (FIG. 2) or the intersection of the rear wall 18 and the right side wall (FIG. 3). Also visible in FIG. 2 is an opening 40 in the housing 11 which allows a playback head 54 of the cassette player to be substantially adjacent to the record head 42 housed in the housing 11.

Figure 4:
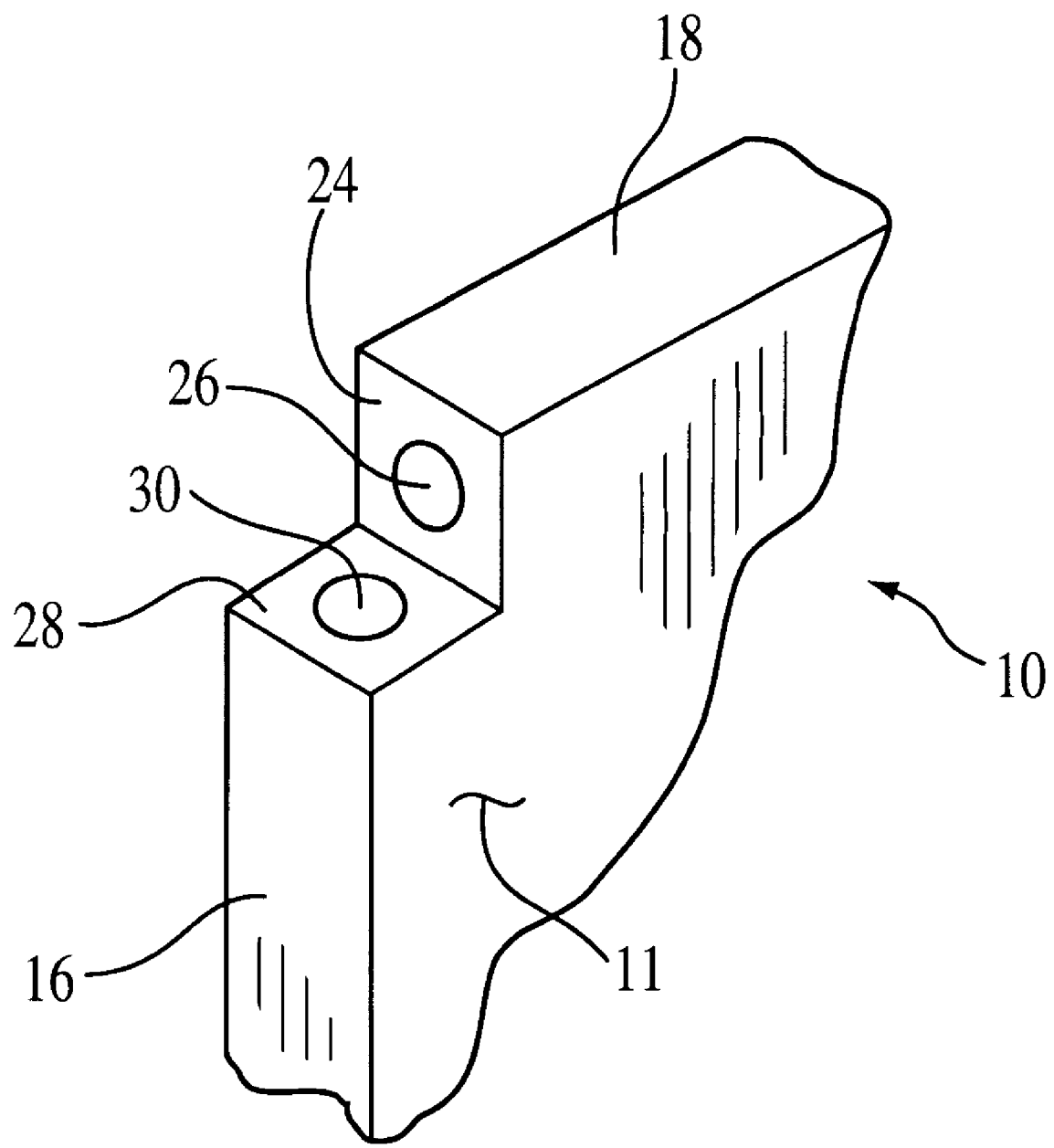
FIG. 4 is perspective view of a portion of the embodiments of FIGS. 1–3.

FIG. 4 is a close-up, perspective drawing of the receptacles 26, 30 and the receptacle areas 24, 28 of the first and second embodiments of the present invention. Receptacle area 28 is positioned at a right angle to left side wall 16 and parallel to rear wall 18. Receptacle area 24 is positioned at a right angle to rear wall 18 and parallel to left side wall 16. In a preferred embodiment of the present invention, receptacle areas 24 and 28 are integral to the housing 11, and housing 11 is molded out of plastic-based materials, such as poly-vinyl chloride, or other substantially rigid materials. In such an embodiment, receptacles 26 and 30 are positioned within housing 11 such that their outer-most edges are substantially flush with the respective receptacle areas 24 and 28.

Alternatively, connectors 26 and 30 may be plugs rather than jacks. If connectors 26 and 30 are plugs, only one such connector is used at each intersection, and the dimensions of the cutouts are selected so that the outer-most edges of the plugs are substantially flush with a line extending across the peripheral wall perpendicular to the plug.

Figure 5:
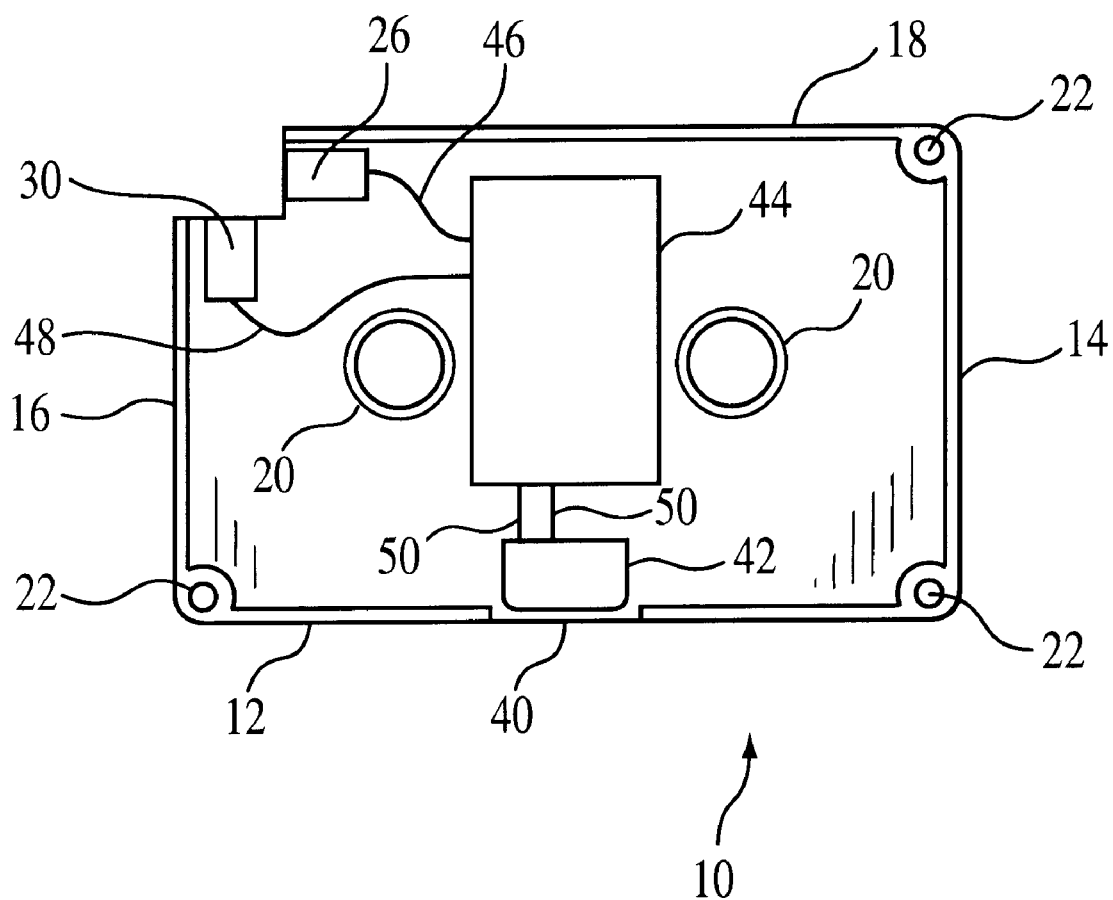
FIG. 5 is a top plan view of the embodiment of FIG. 2 showing the top cover removed.

FIG. 5 is a schematic diagram of a preferred embodiment of the present invention showing elements positioned inside the housing 11. In the case where the housing 11 comprises two halves which may be separated, FIG. 5 shows the adapter 10 with the top half of housing 11 removed. The adapter 10 comprises a record head 42, coupled to electronic circuitry 44, which may be equalization circuitry, via at least one wire 50. The record head 42 is preferably a standard stereo cassette recorder record head. Such a record head 42 is well understood in the art to generate magnetic fields correlating to signals applied to the head 42. While in a typical application in a cassette recorder such a record head is used to change the magnetic fields present on a length of magnetic recording tape, in the present invention the record head 42 is used to generate a magnetic field, in proximity to a playback head of a cassette player, representative of the audio signals applied to the head 42 via the wire 50. From the perspective of a playback head 54 of a cassette player (FIG. 7), the magnetic fields generated by the record head 42 of the adapter 10 induce the playback head 54 of the cassette player to generate electrical audio signals as if a prerecorded tape were being played in the cassette player and generating the magnetic fields incident on the playback head 54.

The audio signals supplied to record head 42 are coupled from equalization circuitry 44 by the wire 50. Equalization circuitry 44 receives audio signals from wires 46, 48 which couple the equalization circuitry 44 and the receptacles 26 and 30. One embodiment of equalization circuitry is described in U.S. Pat. No. 4,734,897. Another embodiment of equalization circuitry is described in U.S. Pat. No. 4,287,388. While in FIG. 5 only two receptacles 26 and 30 are shown connected to equalization circuitry 44, it will be understood by those skilled in the art that virtually any number of receptacles 26, 30 may be coupled to equalization circuitry 44, limited only by the physical dimensions of the receptacles and of the housing 11. In a preferred embodiment, receptacles 26 and 30 are 1/8 inch (about 3.175 mm.) stereo phono jacks which can be detachably connected to 1/8 inch (about 3.175 mm.) stereo phono plugs, such as connector 32, to couple a stereo audio signal from an external audio signal generator, such as a portable compact disc player or a cellular telephone, to the equalization circuitry 44. The equalization circuitry 44 is used to filter the audio signals from the external audio signal generator and make them compatible with the record head 40/playback head 54 combination when the adapter is used in a cassette player.

Although not shown in FIG. 5, other elements contained in the housing 11 may include gears, belts, or combinations thereof to couple the two reels 20 such that the rotation of one will cause the other to rotate as well. This may be required when the adapter 10 is to be used in certain playback decks which have auto-reverse capability. In such playback decks, there are sensors to determine whether one or both reel drive spindles are rotating. If the sensors indicate that one spindle is not moving, the logic circuitry of such a deck will reverse the direction of the reel driver and begin playing the other side of the cassette tape. When a standard, pre-recorded magnetic tape is contained in a housing, this allows for normal operation and the automatic playing of a second side of the tape when the first side has been completed. Such an auto-reversing cassette player, however, when used with the adapter 10 of the present invention, will continuously switch sides and will not properly couple the audio signals from the adapter 10 to the cassette player's audio circuitry 58. Thus, the adapter 10 may include coupling means between the reels 20 so that the playback deck does not attempt to play back the other side of the adapter 10 as if it were a standard, pre-recorded cassette tape.

Figure 6:
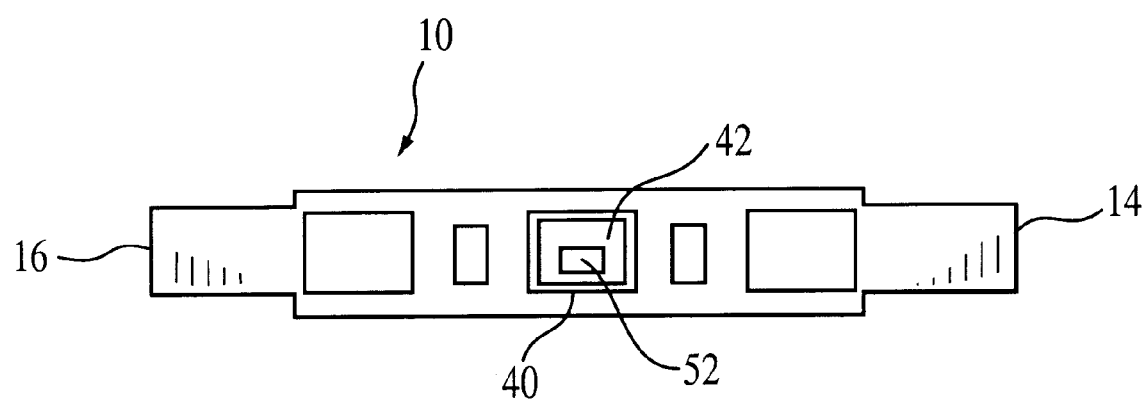
FIG. 6 is a top perspective view of one edge of the adapter of the various embodiments of the present invention.

FIG. 6 is a side view of the front wall 12 of the present invention, in which the record head 42, having a recording portion 52, is accessed through opening 40 in housing 11.

Figure 7:
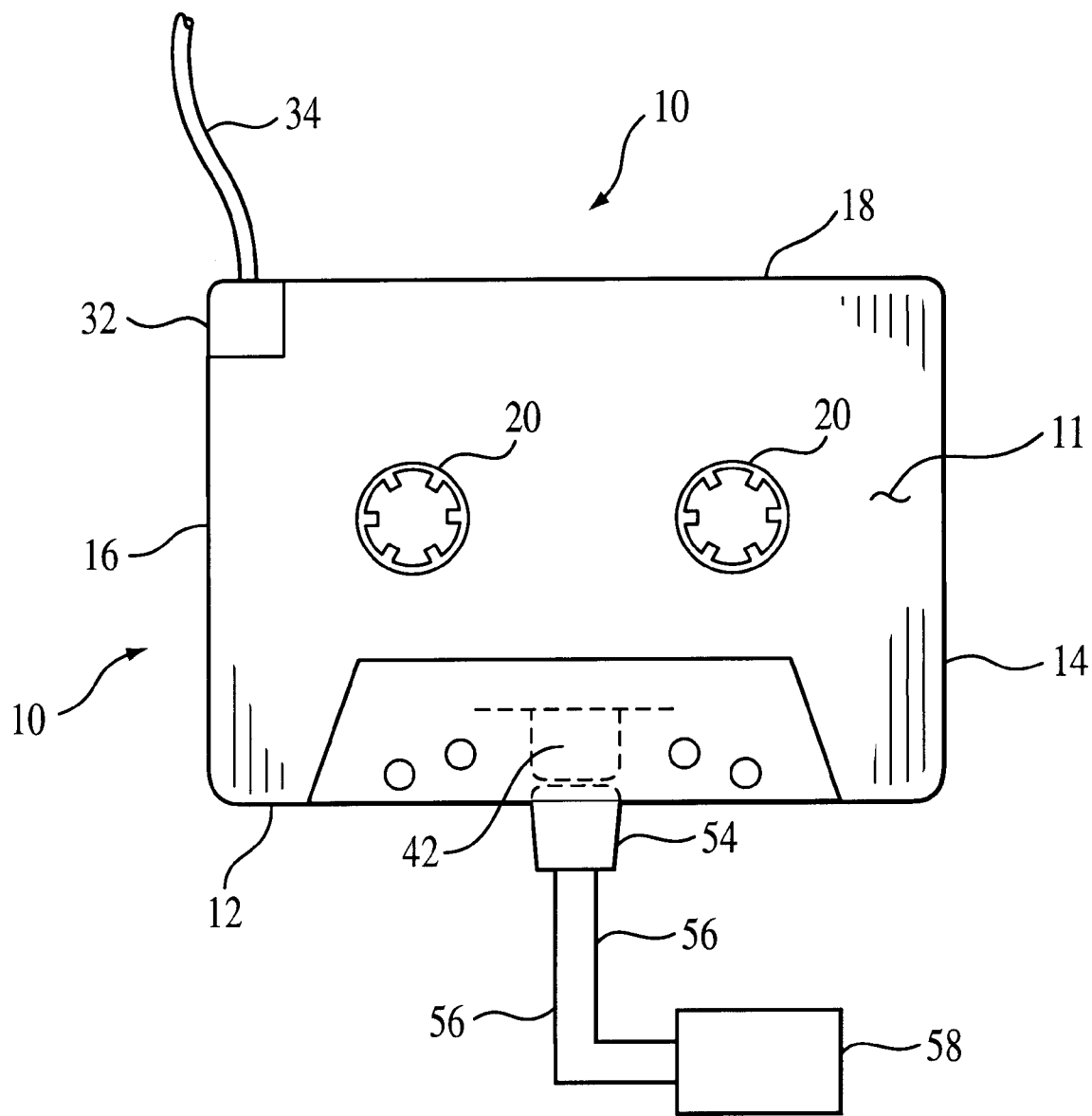
FIG. 7 is a top plan view of the embodiment of the adapter of FIG. 2 shown in use in accordance with the present invention.

FIG. 7 is a schematic diagram of a cassette adapter 10 of the present invention in use. The cable 34 is connected to housing 11 in the front loading arrangement, whereby the adapter's record head 42 is in proximity to the playback head 54 of the cassette player. The playback head 54 couples the audio signals generated by record head 42, via wires 56, to playback circuitry 58. Playback circuitry 58 is generally part of the cassette player and typically includes equalization circuitry, amplification circuitry, and speakers for reproducing the audio signals generated by playback head 54.

While the angle between the first connector and the second connector has been described as a right angle, those skilled in the art will recognize that the invention is not limited to such an angle. The angle between the first connector may be acute, obtuse, or right without departing from the scope of the invention.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. An adapter for coupling audio signals from a source to a cassette player, the adapter comprising:
    a cassette-shaped housing;
    a record head disposed in the housing in a position substantially adjacent to a playback head of the cassette player when the adapter is inserted in the cassette player;
    a first connector detachably connectable to a complementary connector, the first connector positioned along a first peripheral wall of the housing; and
    a conductive circuit coupled to the record head and the first connector.

2. The adapter of claim 1 wherein the conductive circuit comprises an equalization circuit.

3. The adapter of claim 1 comprising a second connector detachably connectable to the complementary connector and coupled to the conductive circuit.

4. The adapter of claim 3 wherein the second connector is positioned along a peripheral wall of the housing and at a predetermined angle to the first connector.

5. The adapter of claim 3 wherein the second connector is positioned along a peripheral wall of the housing and at a right angle to the first connector.

6. The adapter of claim 5 wherein the first connector comprises a 1/8 inch stereo phono jack.

7. The adapter of claim 6 wherein the complementary connector comprises a first 1/8 inch stereo phono plug.

8. The adapter of claim 7 wherein the second connector comprises a 1/8 inch stereo phono jack.

9. The adapter of claim 7 wherein the complementary connector comprises a length of wire and a second 1/8 inch stereo phono plug.

10. The adapter of claim 3 wherein:
    the first connector comprises a first 1/8 inch stereo phono plug;
    the complementary connector comprises a 1/8 inch stereo phono jack; and
    the second complementary connector comprises a second 1/8 inch stereo phono plug.

11. A method of converting an adapter for coupling audio signals from a source to a cassette player from a configuration for using the adapter in a front-load cassette player to a configuration for using the adapter in a side-load cassette player, the adapter comprising a cassette-shaped housing, a record head supported in the housing substantially adjacent to a playback head of the cassette player when the adapter is inserted in the cassette player, a first connector detachably connectable to a complementary connector, the first connector positioned along a first peripheral wall of the adapter, a second connector detachably connectable to the complementary connector, the second connector positioned along a second peripheral wall of the adapter and at a predetermined angle to the first connector, and a conductive circuit coupled to the first connector, the second connector, and the record head, the method comprising the steps of:
    disconnecting the complementary connector from the first connector; and
    connecting the complementary connector to the second connector.

12. The method of claim 11 further comprising the step of inserting the adapter into a side-load cassette player.

13. The method of claim 11 wherein:
    the first connector comprises a first 1/8 inch stereo phono jack;
    the second connector comprises a second 1/8 inch stereo phono jack; and the complementary connector comprises a first ⅛ inch stereo phono plug.

14. The method of claim 11 wherein the predetermined angle between the first connector and the second connector is substantially a right angle.

15. The method of claim 11 wherein the complementary connector comprises a length of wire and a second ⅛ inch stereo phone plug.

16. The method of claim 11 wherein the conductive circuit comprises an equalization circuit.

17. A method of converting an adapter for coupling audio signals from a source to a cassette player from a configuration for using the adapter in a side-load cassette player to a configuration for using the adapter in a front-load cassette player, the adapter comprising a cassette-shaped housing, a record head supported in the housing substantially adjacent to a playback head of the cassette player when the adapter is inserted in the cassette player, a first connector detachably connectable to a complementary connector, the first connector positioned along a first peripheral wall of the adapter, a second connector detachably connectable to the complementary connector, the second connector positioned along a second peripheral wall of the adapted and at a predetermined angle to the first connector, and a conductive circuit coupled to the first connector, the second connector, and the record head, the method comprising the steps of:

disconnecting the complementary connector from the first connector; and connecting the complementary connector to the second connector.

18. The method of claim 17 further comprising the step of inserting the adapter into a front-load cassette player.

19. The method of claim 17 wherein:

the first connector comprises a first ⅛ inch stereo phono jack;

the second connector comprises a second ⅛ inch stereo phono jack; and the first complementary connector comprises a first ⅛ inch stereo phono plug.

20. The method of claim 17 wherein the first complementary connector comprises a length of wire and a second ⅛ inch stereo phone plug.

21. The method of claim 17 wherein the conductive circuit comprises an equalization circuit.

22. The method of claim 17 wherein the predetermined angle between the first connector and the second connector is substantially a right angle.

23. A kit comprising:

an adapter for coupling audio signals from a source to a cassette player, the adapter comprising: a cassette-shaped housing; a record head disposed in the housing in a position substantially adjacent to a playback head of the cassette player when the adapter is inserted in the cassette player; a connector detachably connectable to a complementary connector, the connector positioned along a peripheral wall of the housing; and a conductive circuit coupled to the record head and the connector; and the complementary connector.

24. The kit of claim 23 comprising a dummy connector removably connectable to the connector.

* * * * *